(No Model.) 2 Sheets—Sheet 2.
S. A. WALTER.
DISH WASHING MACHINE.
No. 482,706. Patented Sept. 13, 1892.
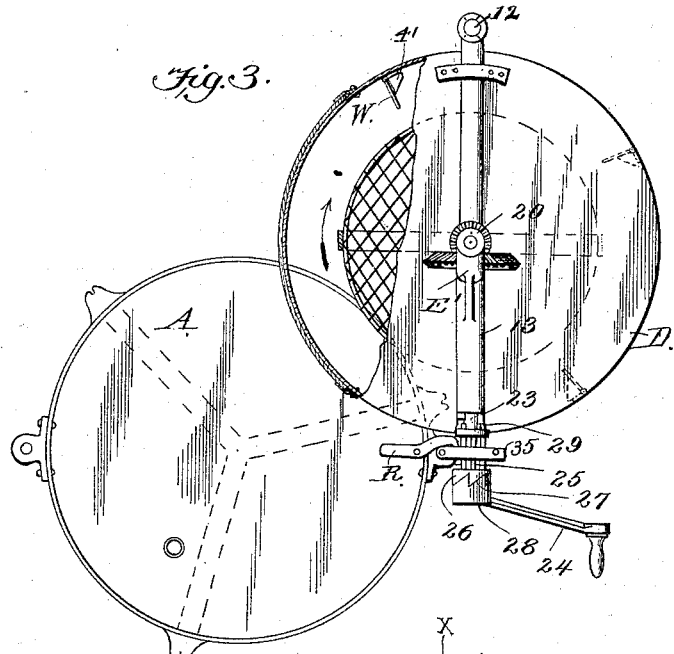
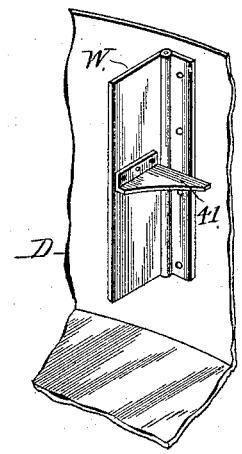
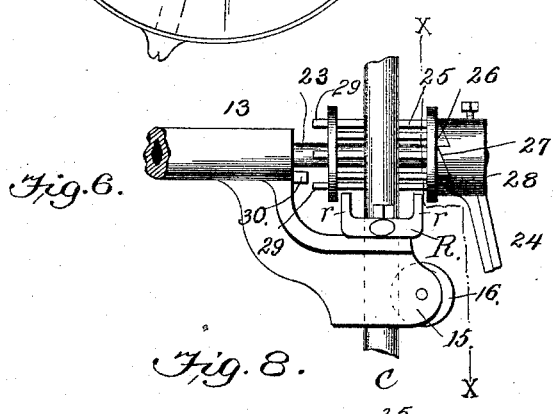
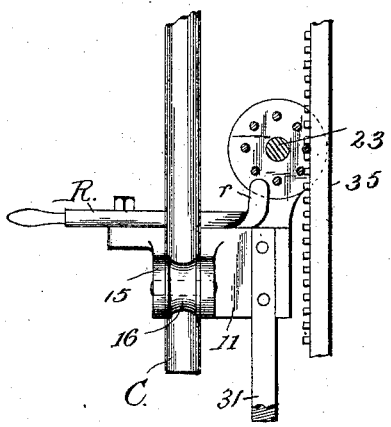
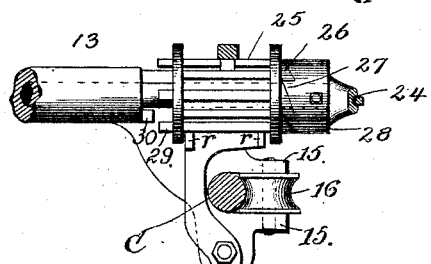
Witnesses
Inventor
Stephen A. Walter
By his Attorneys
A. H. Evans & Co.

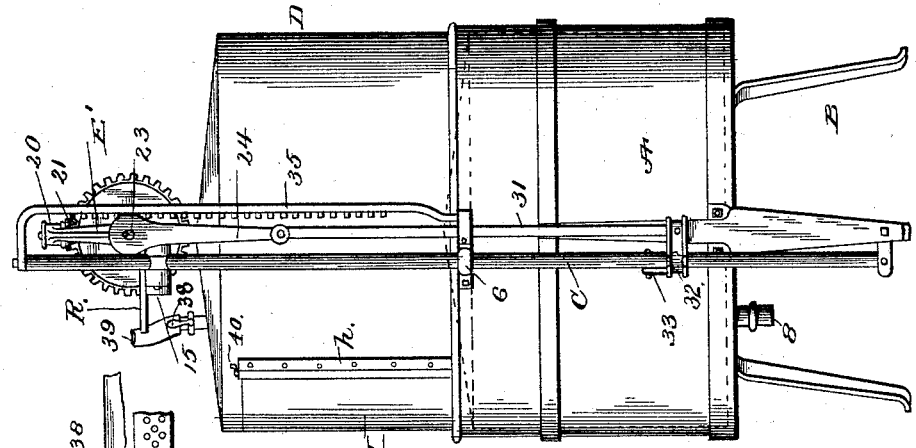

UNITED STATES PATENT OFFICE.

STEPHEN A. WALTER, OF MOLINE, ILLINOIS.

DISH-WASHING MACHINE.

SPECIFICATION forming part of Letters Patent No. 482,706, dated September 13, 1892.

Application filed March 17, 1892. Serial No. 425,252. (No model.)

*To all whom it may concern:*

Be it known that I, STEPHEN A. WALTER, a citizen of the United States, residing at Moline, in the county of Rock Island and State of Illinois, have invented certain new and useful Improvements in Dish-Washing Machines, as set forth in the accompanying drawings, forming part of this specification, in which—

Figure 1 is a side elevation, partially broken away, of a dish-washing machine embodying my invention. Fig. 2 is an elevation from one of the opposite sides. Fig. 3 is a top view showing the basket-holding vessel swung outwardly to one side of the water tank or vessel. Fig. 4 is a detail showing a portion of the pipe 39 with its controlling-valve and spray-pipe. Fig. 5 is a detail showing a portion of the receptacle with one of its wings W in an outward position. Fig. 6 is an enlarged side view of the clutch mechanism and driving-pinion. Fig. 7 is a sectional view of the same on the line $x\ x$ of Fig. 6. Fig. 8 is a top view of Fig. 6.

My invention relates to means for washing dishes. It is an improvement on my former patent, No. 456,877, granted to me January 12, 1892; and it consists of the constructions, arrangements, and combinations of devices, which I shall hereinafter fully describe and claim.

To enable others skilled in the art to which my invention appertains to make and use the same, I will now describe its construction and indicate the manner in which the same is carried out.

Referring to the drawings for a more complete explanation of my invention, A represents a tank or vessel of suitable form and construction supported upon legs B and adapted to contain water, said tank having secured to its sides the guides 6, in which are mounted and suitably guided the vertical rods or uprights C C'. This tank or vessel A is open at its upper end, and from its bottom projects an outlet or draw-off cock 8, by means of which the tank may be emptied of its dirty water and cleansed when desired.

The basket-holding vessel or receptacle D is of somewhat smaller diameter than the tank A, and it has its lower end open and its upper end closed to form a support for a casting E, consisting of the arms 10 and 11, the former of which lies close upon top of the vessel and has an eye 12 or opening formed in its outer end to receive the rod or upright C'. The inner end of the arm 10, where it joins the other arm 11 of the casting E, is formed or provided with a bearing or sleeve 13, which also forms a part of the head E', said arm being formed with a horizontal sleeve or bearing 13, whose outer end is suitably braced and supported by a bar 14, as shown in Fig. 1.

Suitable lugs or ears 15 are formed upon the outer end of the arm 11 of the casting and straddle or pass upon each side of the rod or upright C and receive a pivotally-secured guide-pulley 16, which engages the outer face of the upright, and, with the eye or opening 12 on the arm C' engaging the opposite rod or upright, forms a means whereby the basket-holding vessel and its attachments may be guided in their vertical adjustments.

The dish-holding basket F is made of open wire or other foraminous material and is located within a frame G, similar to the one shown in my former patent, said frame having at the center of its top cross-bar the vertical shaft 18, which passes upwardly through the top of the vessel A and through the sleeve or bearing 17, and has its upper end suitably secured in a bearing 20 at the upper end of the head-casting E'. Upon the shaft 18 is secured a pinion 21, which meshes with a gear-wheel 22, fitted to the inner end of the shaft 23, passing through the sleeve 13 of the arm 11 and having a crank-handle 24, secured to its outer end. Upon this shaft 23 is a loose sprocket-pinion 25, having one of its faces formed or provided with a ratchet-surface 26, adapted to engage with a similar surface 27 on the head 28 of the crank-handle. From the opposite face of the pinion 25 project the pins or lugs 29, which are designed to engage a lug or stop 30 on the arm 11 of the casting, for the purpose hereinafter stated. The arm 11 (see Fig. 7) has also secured to it the upper end of a rod or bar 31, whose lower end carries a guide 32, adapted to slide upon the upright C and to engage a pivotally-secured stop 33 thereon, as shown in Figs. 1 and 2, said guide 32 having a pulley 34 engaging the face of the upright to insure a free sliding movement thereon when desired. A rack-bar 35 is secured to and carried by the rod or bar 31, and is adapted to be engaged by the pinion 25 on the shaft 23.

Across the bottom of the basket-holding frame G is a bar G', having a step 36 at its center upon which the bottom of said frame is supported, and in the upper portion of the vessel D is supported a spray pipe or nozzle 37, provided with a controlling-valve 38 and being connected by means of a flexible pipe or connection 39 with any desired source of hot-water supply for rinsing the dishes.

In order that the pinion 25 may be thrown into and out of engagement with the clutch-face of the crank-handle head 27 and also to make or release the contact between the pins 29 and stop 30, I employ a pivotally-secured shipper R, (see Figs. 3, 6, 7, and 8,) whose upturned ends or arms $r$ engage the pinion to throw it into any position desired.

The vessel or receptacle D is provided with a vertically-sliding door H, whose edges work in guides $h$ on the body of the vessel, the said door also having stops 40 engaging the guides $h$ for limiting their downward or closing movement. This vessel D also has secured to its inner walls suitable pivotally secured or hinged wings W, radially disposed and adapted to be thrown outward against suitable braces 41, as shown in Fig. 3, in one movement of the vessel and to fold inward against the sides of the vessel on the reverse movement, for purposes hereinafter stated.

The operation of the machine is substantially as follows: Into the tank A the requisite amount of water is placed, and the vessel D, having been lowered into the dotted position shown in Fig. 2, a rotary movement is given the basket-holding frame and its basket by turning the crank-handle 24, this movement being transmitted to these devices through the medium of the gears 21 and 22 and shafts 18 and 23. The basket with its charge of dishes being submerged in the body of water in the tank and being turned in the direction of the arrow in Fig. 3 causes a rotary movement to be given the water which, acting upon the closed wings W, throws them outward against their braces or stops 41, as shown in Fig. 3. In this latter position the wings serve to divert the rotary course of the water and cause the same to be directed inwardly at right angles and through the open basket onto the dishes, thereby cleansing the latter, which are subjected to a combined washing action due to the circular motion inside of the plane of the inner ends of the wings and the cross-currents due to the wings. Upon turning the crank-handle in the reverse direction the wings fold inward under the influence of the water, and the dishes are relieved by centrifugal force of the sediment and foreign matter which has been loosened or washed off by the prior movement. The shipper R is now operated to throw the pinion 25 into clutch with the crank-handle, which latter being operated causes the pinion to mesh with the rack-bar 35 and to elevate the vessel D with its basket and the whole upper part of the machine into the positions shown in Figs. 1 and 2, the said devices being guided upon the uprights C and C' until the guide 32 on the rod 31 contacts with the stop 33 on the upright C. The crank-handle is now held while the shipper is operated to throw the pinion 25 to the opposite side to cause its pins 29 to engage the stop 30 and thereby hold the parts in their elevated position, with the dish-holding basket above the water of the tank, whereby the dishes may be drained. The cock 38 may now be opened to allow a spray of hot water to be discharged onto the dishes to further clean them, and when perfectly clean the sliding door H is opened and the basket removed. Upon a new charge of dishes being placed within the vessel D and the door H being closed, the pinion 25 is shifted to release the engagement of the pins 29 with the stop 30 and the crank-handle turned to cause the devices to be lowered, the movement necessary to effect this result being substantially the reverse of that described for elevating the parts.

If it is desired to clean the water-tank A or to have access to its interior for any purpose, the devices are operated to elevate the vessel D and its attachments to the position shown in Figs. 1 and 2 and then swinging the stop 33 on the upright C into the dotted position, Fig. 1, when a continued turning of the crank-handle will cause the eye 12 on the arm 10 of the casting E to ride over the top of the upright C' and the vessel D to pass clear of the top of the tank A, when the whole upper portion may swing about the upright C as an axis and be turned laterally into the position shown in Fig. 3.

Having thus described my invention, what I claim as new, and desire to secure by Letters Patent, is—

1. A dish-washing machine comprising a water-tank having vertical guides on opposite sides, a vessel slidable on said guides and provided with a dish-holding basket, and means comprising an engaging rack and pinion carried by the vessel for lowering and raising said vessel into and out of the tank, substantially as herein described.

2. In a dish-washing machine, the combination of a water-tank having vertical uprights or rods, an open-bottom vessel adapted to enter said tank, a dish-holding basket supported within the vessel, suitable guides on said vessel engaging the uprights on the tank, whereby the vessel is vertically guided, a pinion, and a vertically-guided rack-bar engaged thereby for vertically moving the vessel, substantially as herein described.

3. In a dish-washing machine, the combination of a water-tank having the uprights or rods, the vessel D, having an open bottom and closed top, a support for said vessel slidable on said uprights, means for raising and lowering the vessel, a dish-holding basket supported within said vessel, a frame for supporting the basket provided with a shaft mounted in said support, and a shaft and gearing for rotating the frame and basket within said vessel, substantially as herein described.

4. In a dish-washing machine, the combination of a water-tank having the vertical guides upon its exterior opposite sides, an open-bottom vessel adapted to enter said tank, a basket-holding frame supported within said vessel, a dish-holding basket within said frame, means for rotating the frame and its basket, and a rack and pinion by which the inner vessel is moved vertically into and out of the water-tank, substantially as herein described.

5. In a dish-washing machine, the combination of a water-tank, the vertical guides or uprights, the vessel D, having an open bottom and closed top, a casting secured to the top of the vessel for supporting the same and having the arms 10 and 11 guided upon said uprights, and a head-casting E', a basket-holding frame within the vessel D, having a vertical shaft mounted in said head-casting and provided with a pinion, a shaft mounted horizontally within the arm 11 and provided with a gear-wheel, and means for rotating it, whereby the basket and its supporting-frame are rotated, substantially as herein described.

6. In a dish-washing machine, the water-tank, the vessel D, vertically adjustable thereon, the basket-holding frame, and means for rotating the same, in combination with a vertically-movable rack-bar, a pinion loose on the drive-shaft, and a clutch between the pinion and drive-shaft, whereby the vessel D may be raised and lowered, substantially as herein described.

7. In a dish-washing machine, the water-tank, the vessel D, the horizontal and vertical shafts with interposed gearing, a crank-handle on the horizontal shaft having a clutch-surface, a pinion on said shaft having a corresponding surface adapted to engage the clutch-surface of the crank-handle, a pivoted shipper for throwing the pinion into and out of engagement with the crank-handle, and a vertically-guided rack-bar engaged by the pinion to raise and lower the vessel D, substantially as herein described.

8. In a dish-washing machine, the water-tank having the uprights or guides, a vessel movable on said guides in vertical planes, and provided with means for supporting the dish-holding basket, and means for raising said vessel above the plane of the top of the water-tank, whereby said vessel may swing laterally about one of the uprights as an axis, substantially as herein described.

9. In a dish-washing machine, the combination of the water-tank, the open-bottom vessel having means for supporting the basket, the casting for supporting the vessel having the arms 10 and 11 and head-casting E', the vertical and horizontal shafts, and interposed gearing for rotating the basket, the uprights on said tank extending through guides in the ends of the arms 10 and 11, and means for raising and lowering the vessel and enabling it to be swung laterally beyond the vertical plane of the tank and about one of the uprights as an axis, substantially as herein described.

10. In a dish-washing machine, the water-tank with its uprights 10 and 11, the vessel D mounted thereon and supporting the basket, means for rotating said vessel, a pivoted stop on one of the uprights, a rack-bar having a stop for engaging the pivoted stop, and a pinion and driving mechanism for operating the pinion to raise the vessel above the tank and enabling it to be swung laterally about one of the uprights as an axis, substantially as herein described.

11. In a dish-washing machine having a water-tank, a dish-holding vessel, and means for raising and lowering the same, comprising the uprights C and C', a vertically-movable rack-bar provided with a stop, a pinion for moving the rack-bar, and a stop on one of the uprights engaged by the rack-bar and pivotally secured, so that it may be moved to increase the vertical movement of the vessel and to enable said vessel to be raised above the tank and to swing about one of the uprights as an axis, substantially as herein described.

12. In a dish-washing machine, the vessel D, having a vertically-sliding door in its side, a frame within the vessel, and a basket supported therein, in combination with a water-tank and means for rotating the vessel and raising and lowering the same, substantially as herein described.

13. In a dish-washing machine, the tank, the vessel D, with its supporting-casting provided with arms 10 and 11, and the vertical and horizontal shafts and interposed gearing, in combination with a vertically-guided rack-bar, a pinion loose on said horizontal shaft, having the pins or lugs projecting from one of its faces, and a clutch-surface on its opposite face, a locking-lug on the supporting-casting, with which the pins or lugs on the pinion engage to hold the vessel elevated, a pivoted shipper for moving the pinion out of contact with said locking-lug, and a clutch-surface on the drive-shaft, into contact with which the pinion may be thrown, substantially as herein described.

14. In a dish-washing machine, the water-tank, the vessel D with its basket, and means for rotating and raising and lowering the vessel, in combination with a spray pipe or nozzle supported in the top of the vessel and connected with a hot-water supply and a valve for controlling said pipe or nozzle, substantially as herein described.

15. In a dish-washing machine, the tank, the vessel D, provided with a dish-holding basket and having pivotally-secured wings or blades on its inner surface with limiting stops therefor, whereby said wings or blades are thrown outward to direct the water inward toward the center of the vessel and upon the dishes upon one movement of the vessel and folded inward on the reverse movement, and means for rotating the basket, substantially as herein described.

STEPHEN A. WALTER.

Witnesses:
C. F. GRANTZ,
E. A. SCRIBNER.